(12) United States Patent
Noguchi et al.

(10) Patent No.: US 10,326,941 B2
(45) Date of Patent: Jun. 18, 2019

(54) IMAGE GENERATING APPARATUS, IMAGING OBSERVING APPARATUS, IMAGING APPARATUS, AND STORAGE MEDIUM STORING IMAGE PROCESSING PROGRAM

(71) Applicant: CANON KABUSHIKI KAISHA, Tokyo (JP)

(72) Inventors: Kazuhiro Noguchi, Utsunomiya (JP); Katsuhiko Sato, Utsunomiya (JP); Toshifumi Maruyama, Utsunomiya (JP); Rei Ito, Utsunomiya (JP); Yasuhiro Hatakeyama, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 1 day.

(21) Appl. No.: 15/485,289

(22) Filed: Apr. 12, 2017

(65) Prior Publication Data

US 2017/0302856 A1 Oct. 19, 2017

(30) Foreign Application Priority Data

Apr. 15, 2016 (JP) .................. 2016-081885

(51) Int. Cl.
*H04N 5/232* (2006.01)
*H04N 5/225* (2006.01)
*H04N 5/265* (2006.01)

(52) U.S. Cl.
CPC ....... *H04N 5/23293* (2013.01); *H04N 5/2258* (2013.01); *H04N 5/265* (2013.01)

(58) Field of Classification Search
CPC ... H04N 5/23293; H04N 5/2258; H04N 5/265
See application file for complete search history.

(56) References Cited

U.S. PATENT DOCUMENTS

| 6,222,593 | B1 * | 4/2001 | Higurashi | G03B 37/04 315/368.12 |
|---|---|---|---|---|
| 6,393,162 | B1 * | 5/2002 | Higurashi | G06T 5/006 345/629 |
| 8,482,658 | B2 | 7/2013 | Shiohara | |
| 8,633,998 | B2 | 1/2014 | Hayashi et al. | |
| 9,386,227 | B2 | 7/2016 | Irie | |
| 2001/0048802 | A1 * | 12/2001 | Nakajima | G06T 11/60 386/228 |

(Continued)

FOREIGN PATENT DOCUMENTS

JP 2012042805 A * 3/2012
JP 2013098905 A 5/2013

*Primary Examiner* — Antoinette T Spinks
(74) *Attorney, Agent, or Firm* — Rossi, Kimms & McDowell LLP

(57) ABSTRACT

An image generating apparatus includes a first generator configured to obtain a first image using a first camera with a first angle of view, a second generator configured to obtain a second image using a second camera with a second angle of view wider than the first angle of view, and a generator configured to generate an observation image using the first image and the second image. The observation image is observable as a double image in which the first image and the second image are superimposed on each other in an area that contains a center of the first image.

21 Claims, 10 Drawing Sheets

(56) References Cited

U.S. PATENT DOCUMENTS

| | | | |
|---|---|---|---|
| 2003/0169350 A1* | 9/2003 | Wiezel | H04N 5/23222 348/239 |
| 2005/0159916 A1* | 7/2005 | Anabuki | G06T 15/20 702/151 |
| 2008/0069551 A1* | 3/2008 | Wakamatsu | G03B 17/00 396/55 |
| 2013/0083174 A1* | 4/2013 | Sakurabu | H04N 13/128 348/51 |
| 2015/0271415 A1 | 9/2015 | Uemura et al. | |
| 2018/0048825 A1* | 2/2018 | Wang | H04N 5/2258 |

\* cited by examiner

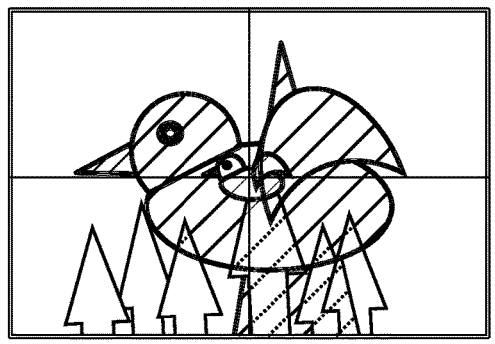 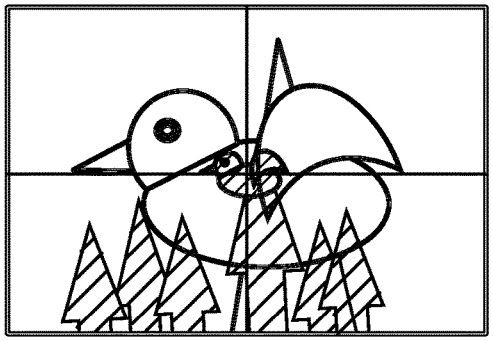
FIG. 11A　　　　　　　　FIG. 11B
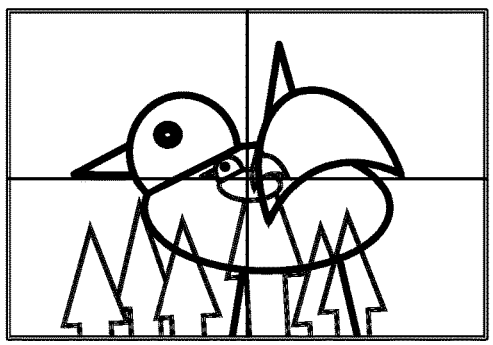 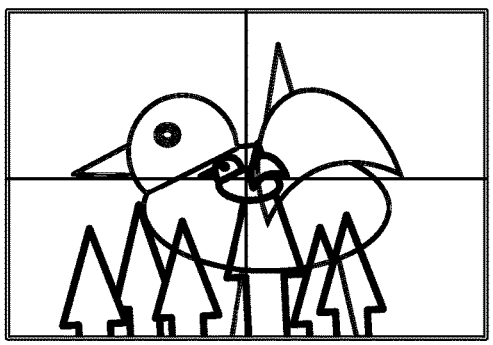
FIG. 12A　　　　　　　　FIG. 12B

IMAGE GENERATING APPARATUS, IMAGING OBSERVING APPARATUS, IMAGING APPARATUS, AND STORAGE MEDIUM STORING IMAGE PROCESSING PROGRAM

BACKGROUND OF THE INVENTION

Field of the Invention

The present invention relates to an image generating apparatus configured to combine and display a plurality of images obtained with different angles of view (field angles).

Description of the Related Art

A telephoto lens enables a distant object to be magnified and imaged, but narrows an imaging range or an angle of view. When a user follows and captures an image of a moving object, such as a running player and a kicked ball in sport (e.g., an association football), the object is likely to deviate from the imaging range and the user observing the object through a viewfinder is likely to lose sight of it. Since the user has difficulties in recognizing a surrounding situation outside the imaging range in viewing through the viewfinder, it usually takes a long time to find the once lost object again and to resume imaging.

Japanese Patent Laid-Open No. ("JP") 2012-42805 discloses a viewfinder displaying method that displays a reduced telephoto image obtained by a camera in a range equal to or smaller than half the viewfinder, and displays a wide-angle image outside that range obtained by another camera having a wider angle of view. JP 2012-42805 also discloses compressively displaying a wide-angle image with an angle of view that is as wide as possible in a limited range in the viewfinder. In addition, JP 2013-98905 discloses a method for displaying a reduced wide-angle image in part of (a periphery of) a telephoto image in a so-called picture-in-picture format.

However, the viewfinder displaying method disclosed in JP 2012-42805 displays a small telephoto image, which is hard to see. In addition, the wide-angle image nonlinearly moves as the camera moves, since the wide-angle image is compressively displayed, and a user has difficulties in intuitively operating the camera while viewing the viewfinder. According to the viewfinder displaying method disclosed in JP 2013-98905, the user has difficulties in seeing the small wide-angle image, and needs to significantly change his visual axis from when he views almost the center of the telephoto image to when he views the periphery of the telephoto image or the wide-angle image. Thus, the user has difficulties in correct and quick framing.

SUMMARY OF THE INVENTION

The present invention provides an image generating apparatus, an image observing apparatus having the same, an imaging apparatus having the same, etc., each of which enables both a telephoto image and a wide-angle image obtained with an angle of view wider than that for the telephoto image to be easily seen and observed.

An image generating apparatus according to one aspect of the present invention includes a first generator configured to obtain a first image using a first camera with a first angle of view, a second generator configured to obtain a second image using a second camera with a second angle of view wider than the first angle of view, and a generator configured to generate an observation image using the first image and the second image. The observation image is observable as a double image in which the first image and the second image are superimposed on each other in an area that contains a center of the first image.

Further features of the present invention will become apparent from the following description of exemplary embodiments with reference to the attached drawings.

BRIEF DESCRIPTION OF THE DRAWINGS

FIGS. 11A and 11B illustrate illustrative double images according to the fourth embodiment.

FIGS. 12A and 12B illustrate other illustrative double images according to a fifth embodiment.

DESCRIPTION OF THE EMBODIMENTS

Referring now to the accompanying drawings, a description will be given of embodiments of the present invention.

First Embodiment

Figure 1:
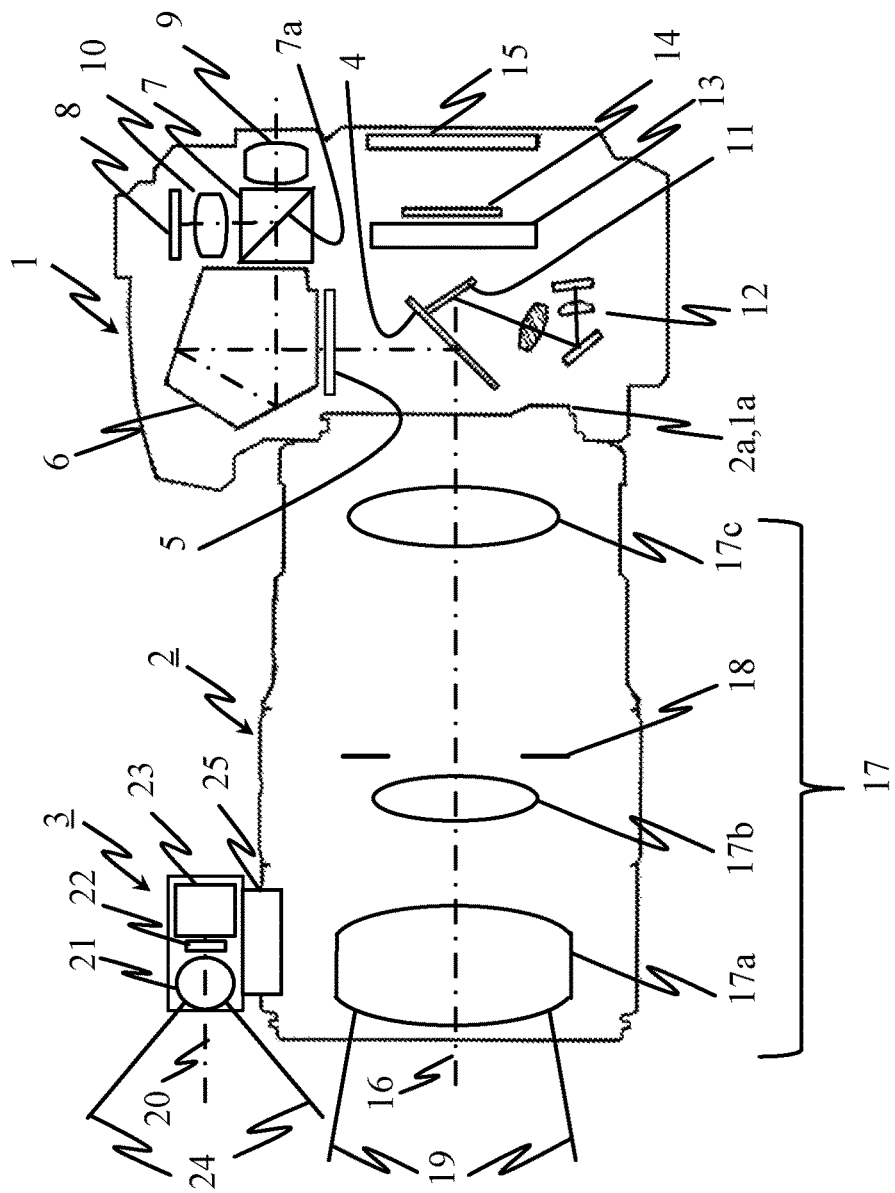
FIG. 1 is a sectional view illustrating a configuration of an imaging system according to a first embodiment of the present invention.
Figure 2:
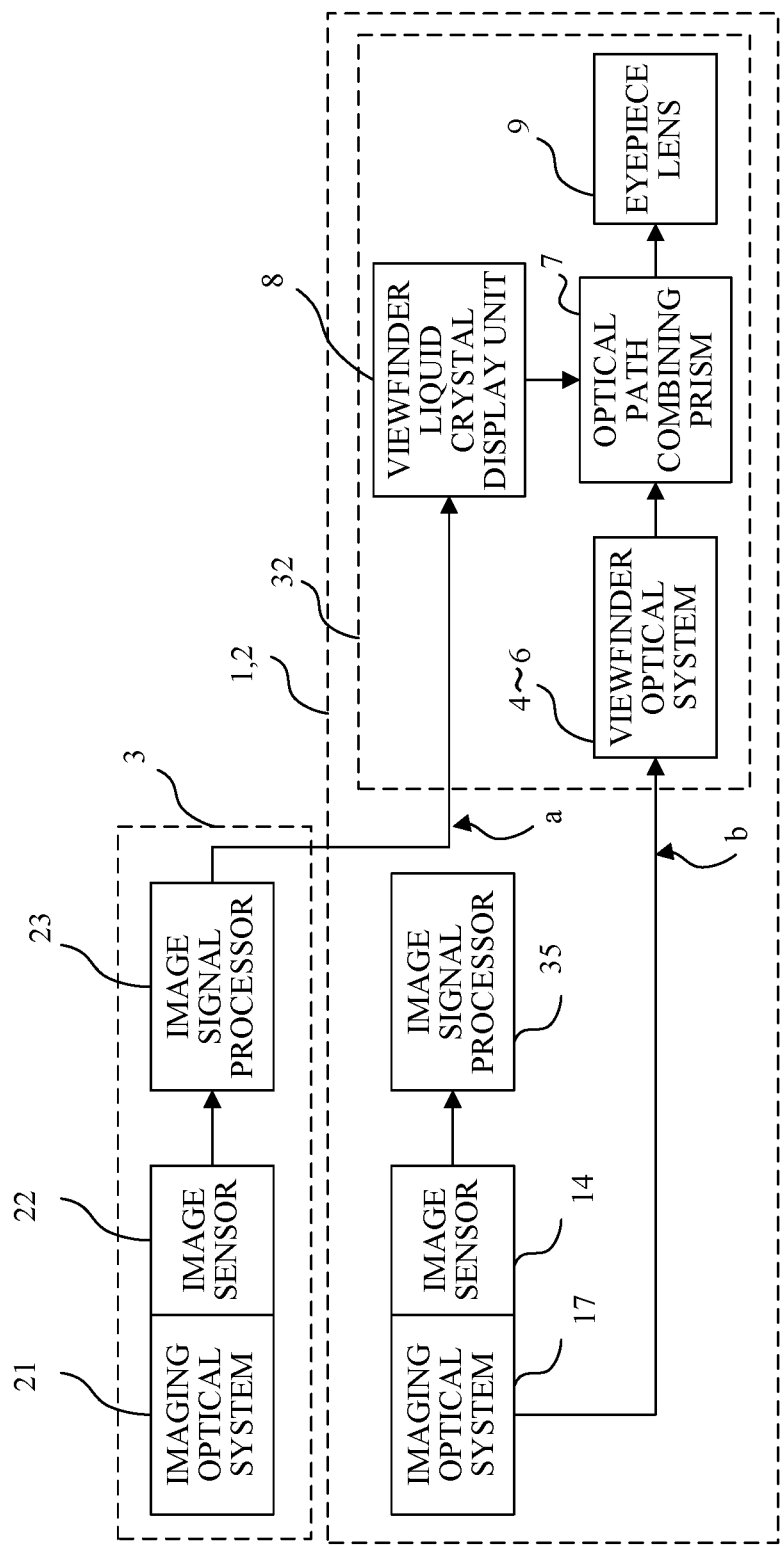
FIG. 2 is a block diagram illustrating the configuration of the imaging system according to the first embodiment.

FIG. 1 illustrates a configuration of an imaging system that includes a digital single-lens reflex camera as an imaging apparatus according to a first embodiment of the present invention (simply referred to as a "camera" hereinafter) 1, and an interchangeable lens 2 attached detachably to the camera 1. FIG. 2 illustrates a block diagram of the configuration of this imaging system. The imaging system includes an image generating apparatus and an image observing apparatus.

The camera 1 and the interchangeable lens 2 are mechanically coupled with each other since a camera mount unit 1a in the camera 1 and a lens mount unit 2a in the interchangeable lens 2 are bayonet-coupled with each other. The camera 1 communicates with the interchangeable lens 2 via electric contacts in the mounts 1a and 2a. A first camera includes the camera 1 and the interchangeable lens 2, which will be collectively referred to as a first camera (1, 2).

The camera 1 includes a viewfinder optical system that includes a main mirror 4, a focus plate 5, and a penta-prism 6, an optical path combining prism (optical element) 7, a liquid crystal monitor 8 that displays a wide-angle image (second image as an electronic image) generated by a second camera 3, and an eyepiece lens 9. An optical viewfinder 32 illustrated in FIG. 2 includes the viewfinder optical system, the optical path combining prism 7, the liquid crystal monitor 8, and the eyepiece lens 9.

Lenses 17*a*, 17*b*, and 17*c* and a diaphragm unit (aperture stop unit) 18 are arranged on an optical axis in the imaging optical system 17 in the interchangeable lens 2. The imaging optical system 17 forms an optical image of an object or an object image, which is located in an imaging range corresponding to an angle of view 19.

A second camera 3 is attached to or fixed onto the tip of the interchangeable lens 2 via a connector (mediation or intervening member or adjuster) 25. The connector 25 serves to adjust an orientation (direction of the optical axis 20 of) and inclination of the second camera 3 so that the optical axis 20 in the second camera 3 is parallel to the optical axis 16 in the interchangeable lens 2. The second camera 3 fixed at the tip of the interchangeable lens 2 captures images in the same direction as that of the first camera (1, 2). The second camera 3 is an imaging apparatus that can capture an image with an angle of view 24 wider than an angle of view (first angle of view) 19 in the interchangeable lens 2 (or the first camera (1, 2)) that is set to the telephoto focal length. An imaging range (object range observable by an optical viewfinder, which will be described later) captured by the first camera (1, 2) is contained in the imaging range captured by the second camera 3.

Light from the object that passes the imaging optical system 17 in the interchangeable lens 2 is reflected by the main mirror 4 disposed in the optical path, and forms an image on the focus plate 5. The object image as the optical image formed on the focus plate 5 is converted into an erect image by the penta-prism 6, and the light forming the erect image enters the optical path combining prism 7. The optical path prism 7 is made by pasting two triangular prisms, and a multilayer dichroic mirror 7*a* is formed on a joint reflective surface in one triangular prism. Thus, the light forming the object image (erect image) and entering the optical path combining prism 7 transmits the dichroic mirror 7*a*, and reaches the eye of the photographer (user) via the eyepiece lens 9. Thereby, a user can observe the object image through the eyepiece lens 9.

The liquid crystal display 8 displays a wide-angle image generated through imaging by the second camera 3 and input to the first camera (1, 2). The light from the liquid crystal monitor 8 is reflected by the dichroic mirror 7*a* in the optical path combining prism 7 and reaches the eye of the user via the eyepiece lens 9. Thereby, the wide-angle image displayed on the liquid crystal monitor 8 and the object image from the focus plate 5 are optically superimposed (overlapped) on each other, and the wide-angle image and the object image can be simultaneously observed as a double image.

The monitor lens 10 is provided to adjust a magnification ratio of the wide-angle image displayed on the liquid crystal monitor 8 and the optical path from the liquid crystal monitor 8 to the optical path combining prism 7. The optical path combining prism 7 may be replaced with a half-mirror.

Thus, this embodiment obtains the object image (optical image illustrated by "b" in FIG. 2) through the imaging optical system 17, the main mirror 4, the focus plate 5, and the penta-prism 6 in the first camera (1, 2). The imaging optical system 17, the main mirror 4, the focus plate 5, and the penta-prism 6 correspond to a first acquirer. In this embodiment, the liquid crystal monitor 8 as a second acquirer obtains and displays the wide-angle image (illustrated by "a" in FIG. 2) as a second image generated by the second camera 3. In addition, the optical path combining prism 7 as a generator generates an observation image that can be observed as a double image in which the object image and the wide-angle image are superimposed on each other, and presents the double image to the user so that he can observe it. The image generating apparatus includes the imaging optical system 17, the main mirror 4, the focus plate 5, the penta-prism 6, the liquid crystal monitor 8, and the optical path combining prism 7, and the image observing apparatus includes the eyepiece lens 9 in addition to these components.

The camera 1 further includes a sub-mirror 11, a focus detecting unit 12, a focal plane shutter 13, an image sensor 14, and a back display panel 15. Part of light that passes the interchangeable lens 2, forms the object image transmits the main mirror 4, is reflected on the sub-mirror 11, and is led to the focus detecting unit 12. The focus detecting unit 12 includes a field lens, a secondary imaging lens, and an AF sensor (light receiving sensor), and detects a focus state of the imaging optical system 17 by a so-called phase difference detection method. The image sensor 14 is a photoelectric conversion element, such as a CCD sensor and a CMOS sensor, configured to photoelectrically convert (or capture) the object image and to output an image signal. The back display panel 15 displays various information on an image generated based on the image signal from the image sensor 14 and an imaging condition.

The second camera 3 includes an imaging optical system 21, an image sensor 22 configured to photoelectrically convert an object image formed by the imaging optical system 21, and an image signal processor 23 configured to generate a wide-angle image (second image) using the image signal output from the image sensor 22. The imaging optical system 21 includes one or more lenses.

This embodiment sets an angle of view 24 in the second camera 3 to a value four times as large as the angle of view 19 in the interchangeable lens 2.

The image sensor 14 in the camera 1 has a 35 mm full size (36 mm×24 mm), and the image sensor 22 in the second camera 3 has a size of 1/2.3 type (62 mm×4.7 mm) and a diagonal length ratio of 5.7:1. In general, when the same angle of view is captured by differently sized image sensors with the same open F-number, the size of the imaging optical system (length×diameter of the imaging optical system) has a value close to the diagonal length ratio of the image sensor. In addition, the overall length of the imaging optical system that uses a wide-angle imaging optical system becomes shorter if the image sensors are equally sized. Moreover, as the actual focal length is shorter (as the image sensor is smaller) with the same angle of view, the depth of field becomes deeper, and as the angle of view becomes wider, the depth of field is deeper. The second camera 3 according to this embodiment is a small camera with a deep depth of field, and provides a less blurred image for objects from the short distance to infinity. The effects will be described later.

A still image is captured in accordance with the following procedure. An unillustrated control unit (camera microcomputer) in the camera 1 obtains a focus state of the imaging optical system 17 from the focus detecting unit 12, and obtains luminance information of the object from an unillustrated photometric unit. The control unit then sends to the interchangeable lens 2 a driving amount of the lens 17*c* having a focusing function and an F-number for the diaphragm unit 18. An unillustrated control unit (lens microcomputer) in the camera 2 drives the lens 17*c* in accordance with the received driving amount, and narrows the diaphragm unit 18 in accordance with the received F-number.

Thereafter, the camera microcomputer removes the main mirror 4 and the sub-mirror 11 from the optical path, and drives the focal plane shutter 13 at a predetermined shutter speed so as to expose the image sensor 14. The image signal processor 35 in the camera generates a still image as an electronic image by performing a variety of processes for the image signal output from the image sensor 14.

Before a motion image is captured, the main mirror 4 and the sub-mirror 11 are retreated to the outside of the optical path, and the image sensor 14 is continuously exposed while the focal plane shutter 13 is opened. The image signal processor 35 sequentially generates a plurality of frame images as electronic images that form a motion image by performing a variety of processes for the captured images output from the image sensor 14 for each frame. The focus state and luminance information in the motion image capturing are detected by processing the image signal from the image sensor 14, and the microcomputer drives the lens 17c and the diaphragm unit 18 in accordance with the detected result. The obtained motion image can be observed by the back display panel 15. The luminance of the motion image is determined based on the F-number, the sensitivity of the image sensor 14, and an electronic shutter configured to control the charge accumulation time period of the image sensor 14.

In this embodiment, when the main mirror 4 retreats to the outside of the optical path, the double image cannot be observed through the optical viewfinder. The double image can be observed in aiming for observing the object image before the still image is captured.

Figure 3A:
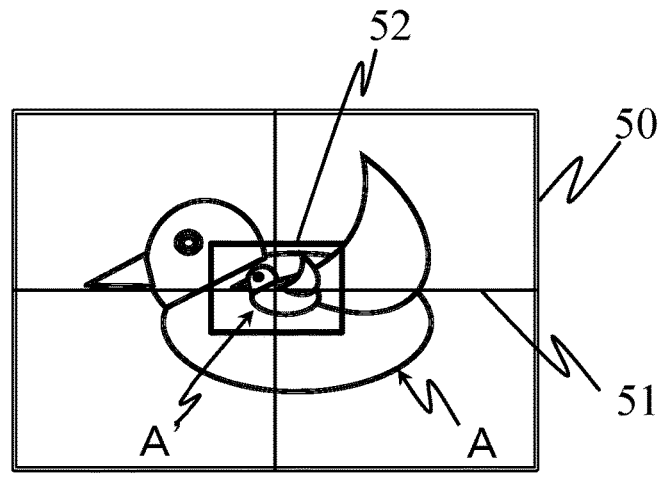
FIGS. 3A to 3C are views for explaining behaviors of combined images obtained in the imaging system according to the first embodiment.
Figure 3B:
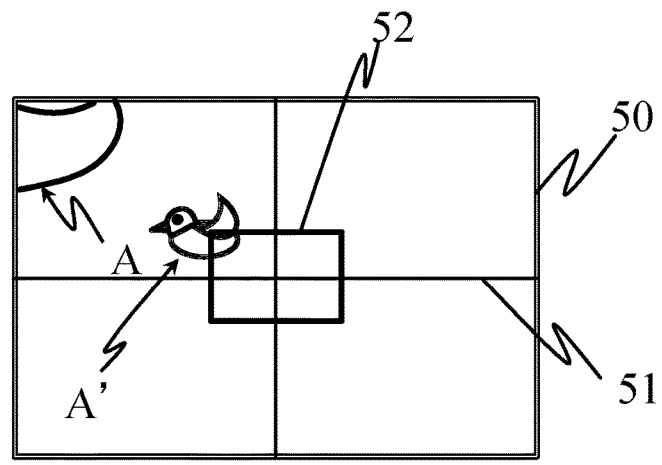
Figure 3C:
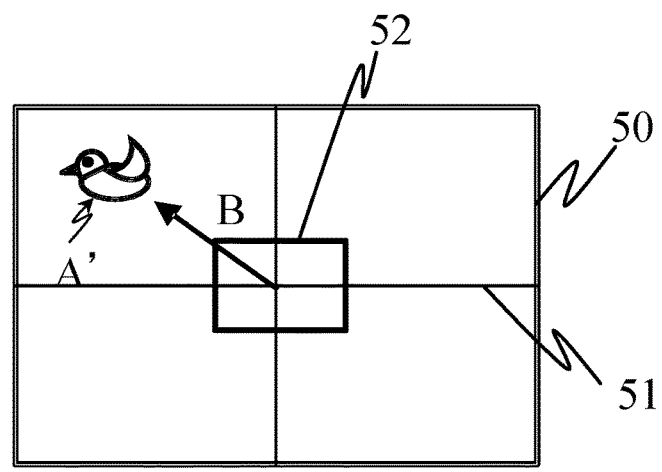

Referring now to FIGS. 3A to 3C, a description will be given of how a double image is viewed. FIGS. 3A to 3C illustrate double images when the first camera (1, 2) and the second camera 3 have coincided centers of angles of view (on the optical axis) and there is no relative inclination between these angles of view (or these angles of view have equal slopes). The object image (optical image) obtained in the first camera (1, 2) are a telephoto object image obtained when the interchangeable lens 2 is set to the telephoto side. The angles of view have coincided centers even when they do not have perfectly coincided centers as long as they have approximately coincided centers (for example, when a shift between these centers is within 10% of the long side or the short side). The angles of view have coincided slopes even when these slopes are not perfectly equal to each other as long as these slopes have approximately equal to each other (for example, when a shift between these slopes is within 10% of one of the slopes).

In this embodiment, the first and second images having the equal sizes are superimposed on each other, and the entire double images form a double area in which the first and second images are superimposed (overlapped) on each other. The double area is an area that contains the center of the first image, of course.

Reference numeral 50 denotes an outer edge of the double image (referred to as an "outer frame" hereinafter). Reference numeral 51 denotes a reticle (cross hairs) as an index that passes the center of the angle of view in the first camera (1, 2). Reference numeral 52 denotes an auxiliary display frame as an index that indicates an angle-of-view range of the first camera (1, 2) on the second image. As described above, the second camera 3 has an angle of view four times as wide as that of the first camera (1, 2), and the auxiliary display frame 52 has a quarter area of the frame 50.

In FIG. 3A, "A" is a main object, such as a flying bird, in the telephoto object image acquired by the first camera (1, 2), "A'" is the same main object in the wide-angle image obtained by the second camera 3. The main objects A and A' are observed as superimposed images since they are captured at the centers of the first and second images. The main objects A and A' have similar to each other.

FIGS. 3B and 3C illustrate that the main object A separates from the angle of view in the first camera (1, 2). At the same time, the main object A' moves from the center of the angle of view in the second camera 3 (on the optical axis). The main object A in the outer frame 50 moves from the center of the reticle 51 with a shift amount four times as large as that of the main object A'. In FIG. 3C, the main object A is lost in the first camera (1, 2), but the main object A' is captured at the corner of the outer frame 50 by the second camera 3. Therefore, the user can easily return to the state in FIG. 3A through the state in FIG. 3B by moving the first camera (1, 2) in an arrow B direction so as to intuitively return the main object A' to the center of the reticle 51.

When the first camera (1, 2) provides the focus control (servo AF) that continues focusing on the main object A, the main object A may escape from the angle of view in the first camera (1, 2) and causes defocus when the user loses sight of the main object A. Even in this case, as described above, the depth of field for the second camera 3 is deeper than that for the first camera (1, 2), and thus the user can clearly and visually recognize the main object A' in the second image and easily recognize the moving direction of the first camera (1, 2).

Figure 4A:
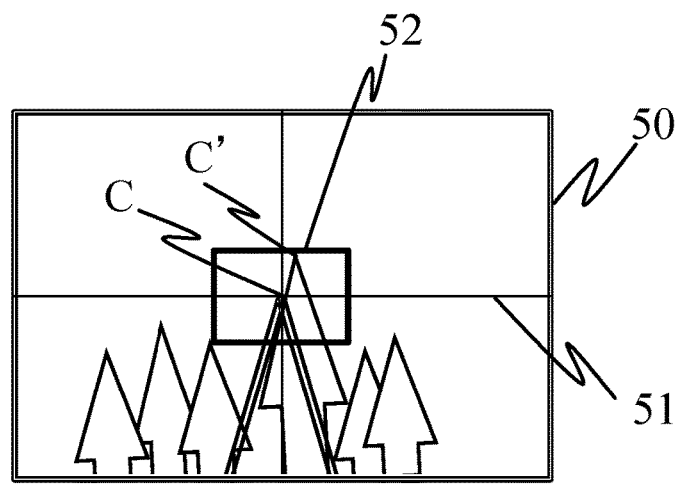
FIGS. 4A to 4C are views for explaining an image combining method according to the first embodiment.
Figure 4B:
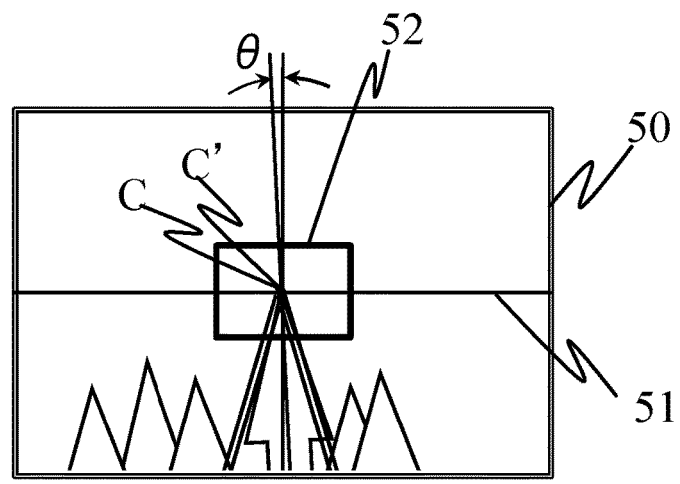
Figure 4C:
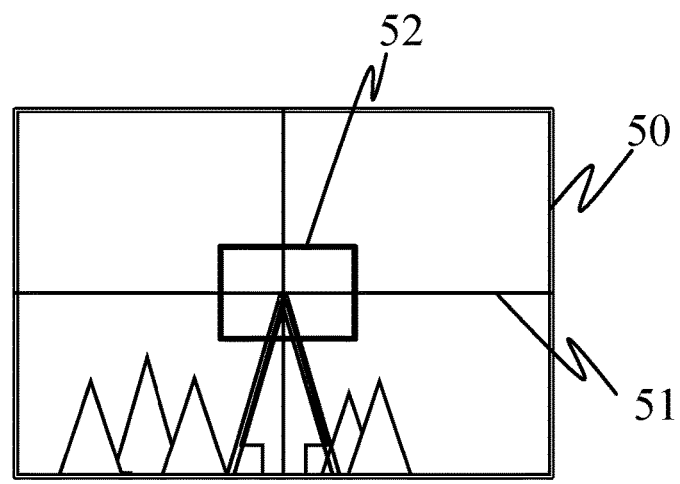

Referring now to FIGS. 4A to 4C, a description will be given of a procedure that coincides the centers of the angles of view and the slopes of the first camera (1, 2) and the second camera 3 with each other. FIGS. 4A to 4C also illustrate the outer frame 50, the reticle 51, and the auxiliary display frame 52, similar to FIGS. 3A to 3C. FIG. 4A illustrates a state before the centers and slopes of the angles of view are coincided with each other. As described above, this embodiment uses the connector 25 that serves to adjust the orientation and the inclination of the second camera 3. It is conceivable that this procedure may be usually performed in manufacturing the first camera (1, 2) that includes the second camera 3, but a general description will be given so as to avoid a duplicate description in second and third embodiments, which will be described later.

FIG. 4A illustrates a double image that is made by superimposing on each other the first image from the first camera (1, 2) that captures a tall tree as a main object (indicated by a doublet with a tip "C") and the second image from the second camera 3 that captures woods that contains only one tall tree. Initially, the center of the angle of view in the first camera (1, 2) is coincided with the tip C so as to position the tree tip C of the main object in the first image at the center of the reticle 51. In FIG. 4A, the tree tip C' in the main object in the second image does not coincide with the tree tip C, and the angle of view in the second camera 3 has a slope ($\theta$ in FIG. 4B) relative to the angel of view in the first camera (1, 2).

Next, as illustrated in FIG. 4B, the orientation of the second camera 3 is adjusted so as to coincide the center of the angle of view in the second camera 3 with the tree tip C' in the main object using the orientation adjusting function of the connector 25. In FIG. 4B, the angle of view in the second camera 3 still has a slope $\theta$ relative to the angle of view in the first camera (1, 2).

Finally, as illustrated in FIG. 4C, the inclination of the second camera 3 is adjusted so as to reduce or zero the slope θ using the inclination adjusting function of the connector 25. Thereby, the double image can be observed while each of the centers and inclinations of the first camera (1, 2) and the second cameras 3 can be coincided with each other.

Second Embodiment

Figure 5:
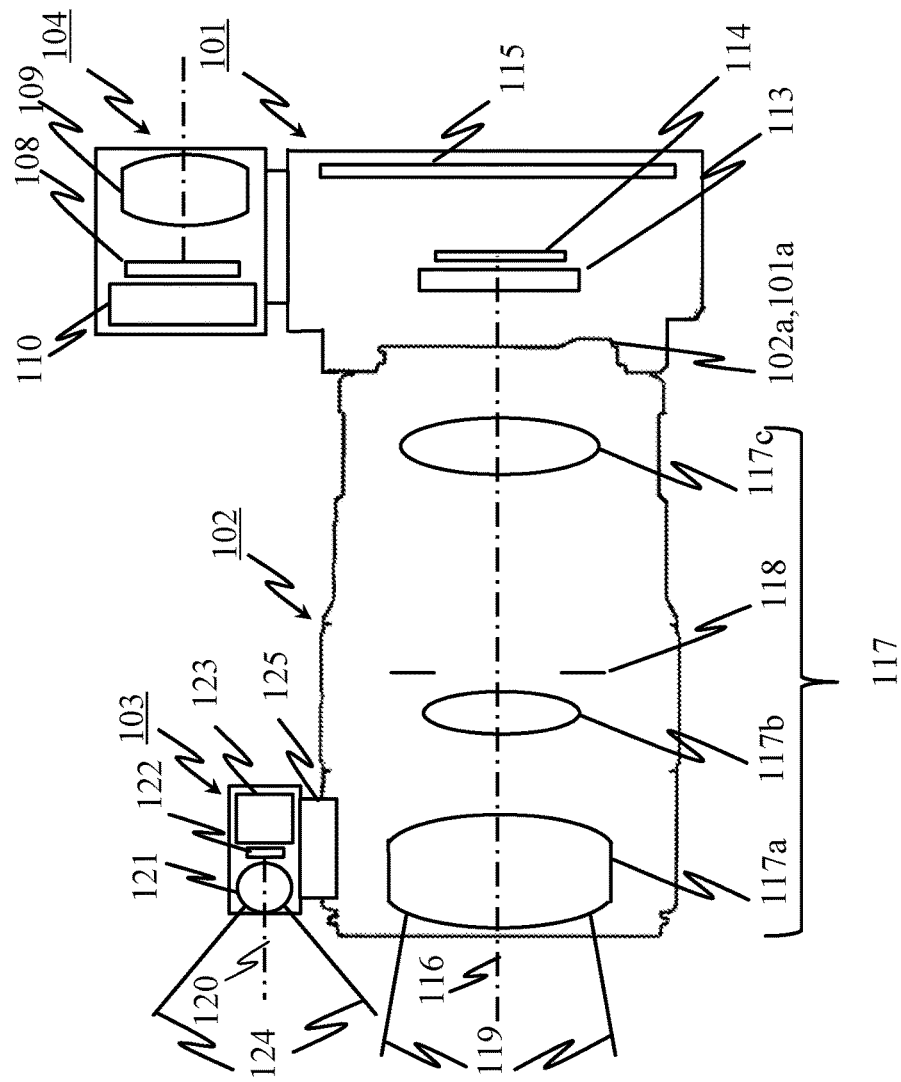
FIG. 5 is a sectional view illustrating a configuration of an imaging system according to a second embodiment of the present invention.
Figure 6:
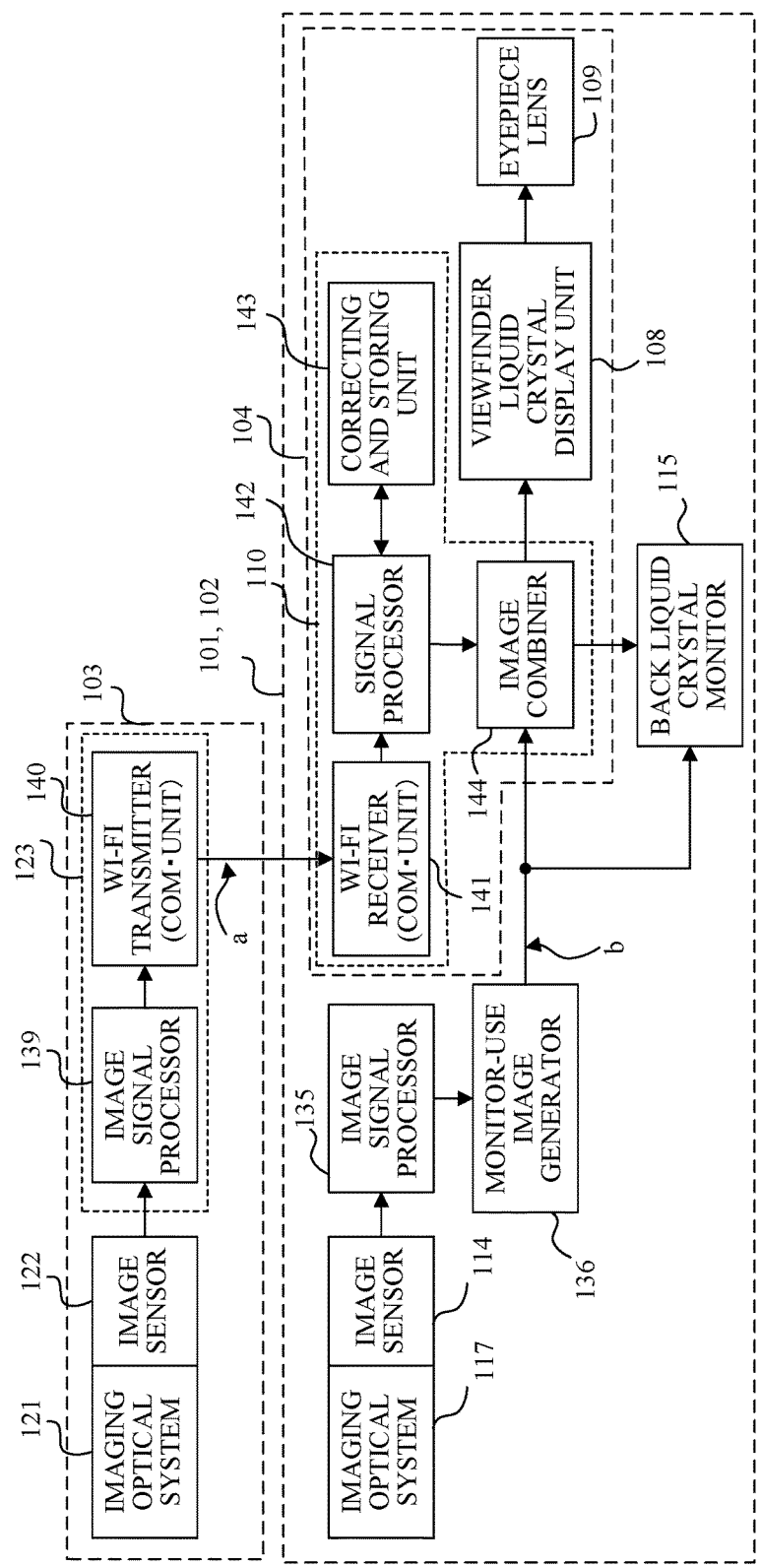
FIG. 6 is a block diagram illustrating the configuration of the imaging system according to the second embodiment.

FIG. 5 illustrates an imaging system that includes an image generating apparatus and an image observing apparatus according to a second embodiment of the present invention. The imaging system includes a digital single-lens reflex camera (simply referred to as a "camera" hereinafter) 101, an interchangeable lens 102 attached detachably to the camera 101, and an electronic viewfinder 104 as an image observing apparatus. FIG. 6 illustrates a block diagram of the configuration of this imaging system.

The camera 101 and the interchangeable lens 102 are mechanically coupled with each other since a camera mount unit 101a in the camera 101 and a lens mount unit 102a in the interchangeable lens 102 are bayonet-coupled with each other. The camera 101 communicates with the interchangeable lens 102 via electric contacts in the mounts 101a and 102a. A first camera includes the camera 101 and the interchangeable lens 102, which will be collectively referred to as a first camera (101, 102).

The camera 101 includes a focal plane shutter 113, an image sensor 114, and a back display panel 115. The focal plane shutter 113, the image sensor 114, and the back display panel 115 serve similarly to the focal plane shutter 13, the image sensor 14, and the back display panel 15 in the first embodiment.

In the interchangeable lens 102, the imaging optical system 117 includes lenses 117a, 117b, and 117c and a diaphragm unit 118 arranged on the optical axis 116. The imaging optical system 117 forms an optical image of an object (object image) in an imaging range corresponding to an angle of view 119.

A second camera 103 is attached to or fixed onto the tip of the interchangeable lens 102 via a connector (intervening member of adjuster) 125. The connector 125 serves to adjust the orientation (direction of the optical axis 120 of) and inclination of the second camera 103 so that the optical axis 120 of the second camera 103 is parallel to the optical axis 116 of the interchangeable lens 102. The second camera 103 fixed at the tip of the interchangeable lens 102 captures an image in the same direction as that of the first camera (101, 102). The second camera 103 is an imaging apparatus that can capture an image with an angle of view wider than the angle of view (first angle of view) 119 of the interchangeable lens 102 (or the first camera (101, 102)) that is set to the telephoto focal length. An imaging range that can be captured by the first camera (101, 102) is contained in part of the imaging range captured by the second camera 103. In this embodiment, the second camera 103 is attached detachably to the connector 125.

An electronic viewfinder 104 is mechanically and electrically connected to an accessory shoe in the camera 101. The electronic viewfinder 104 includes a liquid crystal monitor 108, the eyepiece lens 109, and an electric circuit unit 110. The electric circuit unit 110 includes, as illustrated in FIG. 6, a signal processor 142 that displays an input image on a liquid crystal monitor 108, and a communication unit 141 that includes a receiving function through a wireless communication using Wi-Fi®, Bluetooth®, etc. The electric circuit 110 further includes an image combiner 144, and a correcting and storing unit 143, as described later.

The second camera 103 includes an imaging optical system 121, an image sensor 122, and an image signal processor 123. The image signal processor 123 includes an image signal processor 139 that generates a wide-angle image (second image) that includes a plurality of frame images using an image signal output from the image sensor 122 that has photoelectrically converted the object image, and a communication unit 140 that has a transmission function in the wireless communication.

This embodiment also sets an angle of view 124 in the second camera 103 to a value four times as large as the angle of view 119 in the interchangeable lens 102. The image sensors 114 and 122 are as large as the image sensors 14 and 22 in the first embodiment, respectively. The second camera 103 is also a small camera with a deep depth of field, and provides a less blurred image for objects from the short distance to infinity. The effects are similar to those described in the first embodiment.

In this embodiment, the focal plane shutter 113 opens in the aiming for capturing a still image and in the motion image capturing, and the image sensor 114 is continuously exposed. The image signal processor 135 in the camera 101 sequentially generates a plurality of frame images as electronic images for a motion image through a variety of processes to the image signal output from the image sensor 114 for each frame. Moreover, a monitor-use image generator 136 in the camera 101 performs a predetermined process for each frame image, and generates a telephoto image (first image) that includes a plurality of frame images suitable for displays on the back display panel 115 and the electronic viewfinder 104. In the aiming and motion image capturing, the focus state and the luminance information are detected by processing the image signal from the image sensor 114 and the lens 117c and the diaphragm unit 118 are driven in accordance with the detection result.

The electric circuit unit 110 in the electronic viewfinder 104 includes a microcomputer, and performs the following operations in accordance with an image generating program as a computer program.

The communication unit 141 and the signal processor 142 obtain a wide-angle image "a" from the image signal processor 139 and the communication unit 140 in the second camera 103. The communication unit 141 and the signal processor 142 correspond to the second acquirer. The image combiner 144 generates a double image as an observation image through image processing (combining process) that superimposes (overlaps) the wide-angle image from the signal processor 142 on the telephoto image "b" from the monitor-use image generator 136 in the camera 101. The image combiner 144 corresponds to the first acquirer and the generator. The image generating apparatus includes the electric circuit unit 110 or the communication unit 141, the signal processor 142, the image combiner 144, and the correcting and storing unit 143.

When the second camera 103 is attached to the connector 125, the center and inclination of the angle of view in the second camera 103 may not coincide with those of the first camera (101, 102), as illustrated in FIG. 4A. Thus, the correcting and storing unit 143 that serves as a corrector performs a correction process that accords the centers of the angles of view with each other, as illustrated in FIG. 4B, as the user operates the operation member, such as a cross key and a rotary dial in the camera 101. As illustrated in FIG. 4C, the correcting and storing unit 143 performs a correction process that accords the inclinations of the angles of view with each other for the wide-angle image as illustrated in FIG. 4C. More specifically, the correcting and storing unit 143 performs a correction process that cuts the wide-angle image obtained when the center of the angle of view in the second camera 103 coincides with that in first camera (101, 102), based on the pre-cut wide-angle image generated in the second camera 103.

The correcting and storing unit 143 performs a correction process that rotates the wide-angle image generated in the second camera 103 so as to reduce or zero the slope of the angle of view in the second camera 103 relative to the angle of view in the first camera (101, 102). Thus, as illustrated in FIG. 4C, a double image as an electronic image can be generated which corresponds to the double image obtained when the first camera (101, 102) and the second camera 103 have the coincided centers and equal inclinations of the angles of view.

The correcting and storing unit 143 as a storage unit stores correction information, such as a cut position and rotation angle of the wide-angle image, when the correction process is performed. Thereby, the correcting and storing unit 143 can thereafter automatically perform the correction process by referring to the stored correction information.

The image combiner 144 outputs the double image to and displays the double image on the liquid crystal monitor 108. Thereby, the user can observe and capture the double image through the eyepiece lens 109 in the electronic viewfinder (image observing apparatus) 104.

The image combiner 144 outputs the generated double image to and displays the generated double image on the back display panel 115 as an observation unit. In this case, the back display panel 115 and the electric circuit unit 110 constitute the image observing apparatus. The user can select an observation of the double image through the electronic viewfinder 104 or the observation through the back display panel 115.

The wide-angle image superimposed on the mainly observed telephoto image may be a semi-transmissive image in which the telephoto image can be transparent or an outline image that includes the outline made by extracting the outline of the object. In this case, the image combiner 144 sets the transmittance of the wide-angle image before it is superimposed on the telephoto image, to a proper value, such as 50%, and then superimposes the wide-angle image on the telephoto image. The image combiner 144 superimposes the outline image on the telephoto image, which outline image is generated by applying an edge extraction filter to the wide-angle image before the wide-angle image is superimposed on the telephoto image.

Third Embodiment

Figure 7:
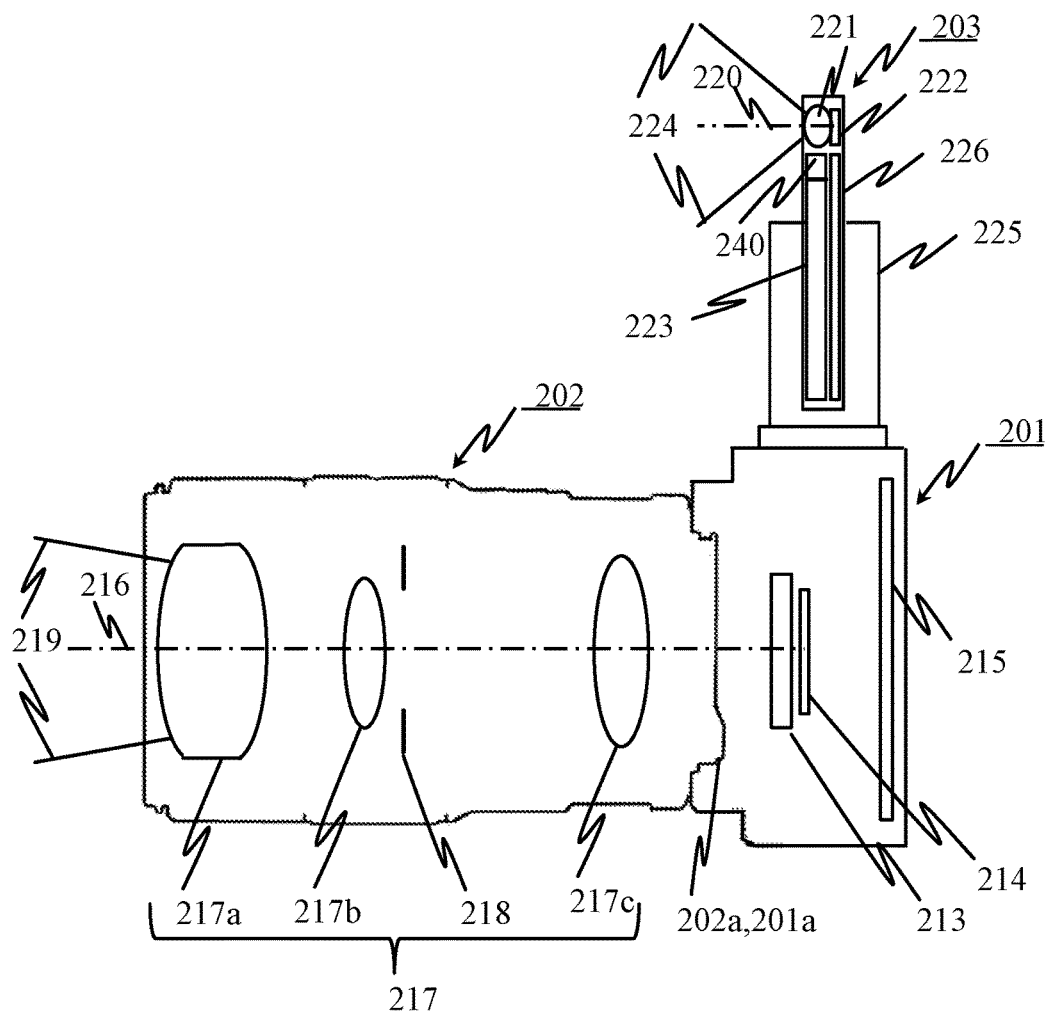
FIG. 7 is a sectional view illustrating a configuration of an imaging system according to a third embodiment of the present invention.
Figure 8:
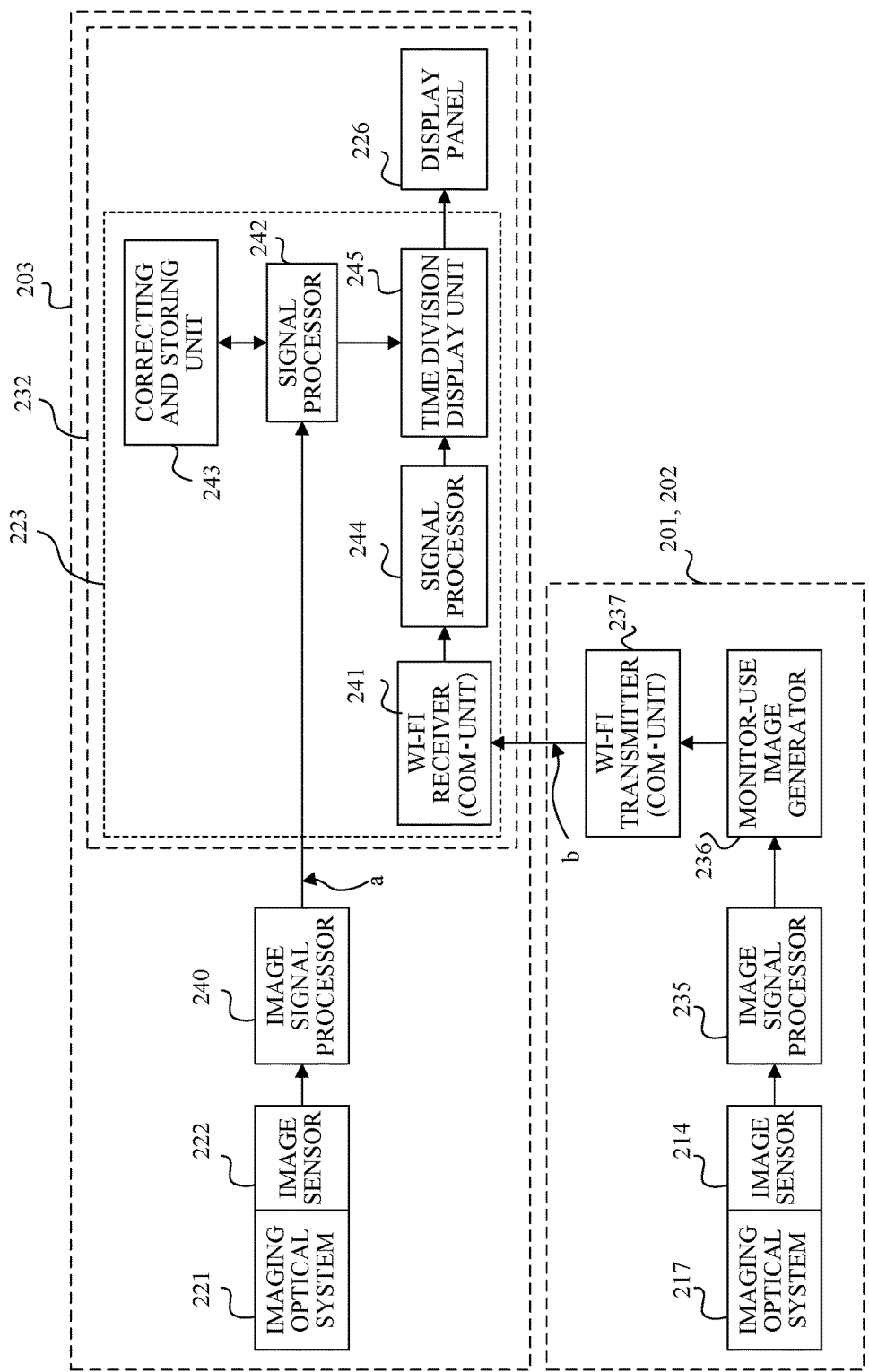
FIG. 8 is a block diagram illustrating the configuration of the imaging system according to the third embodiment.

FIG. 7 illustrates a configuration of an imaging system that includes an image generating apparatus and image observing apparatus according to a third embodiment of the present invention. The imaging system includes a digital single-lens reflex camera (simply referred to as a "camera" hereinafter) 201, an interchangeable lens 202 attached detachably to the camera 201, and a cellular phone (referred to as a "smartphone" hereinafter) 203 having an imaging function as a second camera attached to the camera 201. FIG. 8 is a block diagram of the configuration of this imaging system.

The camera 201 and the interchangeable lens 202 are mechanically coupled with each other since a camera mount unit 201a in the camera 201 and a lens mount unit 202a in the interchangeable lens 202 are bayonet-coupled with each other. The camera 201 communicates with the interchangeable lens 202 via electric contacts in the mounts 201a and 202a. A first camera includes the camera 201 and the interchangeable lens 202, which will be collectively referred to as a first camera (201, 202).

The camera 201 includes a focal plane shutter 213, an image sensor 214, and a back display panel 215. The focal plane shutter 213, the image sensor 214, and the back display panel 215 serve similarly to the focal plane shutter 13, the image sensor 14, and the back display panel 15 in the first embodiment.

In the interchangeable lens 202, the imaging optical system 217 includes lenses 217a, 217b, and 217c and a diaphragm unit 218 arranged on the optical axis 216. The imaging optical system 217 forms an optical image of an object (object image) in the imaging range corresponding to an angle of view 219.

The smartphone 203 is attached to or fixed onto an accessory shoe provided on the top surface of the camera 201 via a connector (intervening member or adjuster) 125. The connector 125 serves to adjust the orientation (direction of the optical axis 220 of) and inclination of the smartphone 203 so that the optical axis 220 of the smartphone 203 is parallel to the optical axis 216 of the interchangeable lens 202. The smartphone 203 fixed onto the camera 201 captures an image in the same direction as that of the first camera (201, 202). The smartphone 203 can capture an image with an angle of view wider than the angle of view (first angle of view) 219 in the interchangeable lens 202 (or the first camera (201, 202)) that is set to the telephoto focal length. An imaging range that can be captured by the first camera (201, 202) is contained in part of the imaging range captured by the smartphone 203.

The smartphone 203 is attached detachably to the connector 225. The connector 225 is attached detachably to the accessory shoe.

In the smartphone 203, an imaging optical system 221 is disposed on an optical axis 220. The imaging optical system 221 includes one or more lenses. The smartphone 203 includes an image sensor 222 configured to photoelectrically convert the object image formed by the imaging optical system 221, and an image signal processor 240 configured to generate a wide-angle image (second image) including a plurality of frame images, using the image signal output from the image sensor 222. The image sensors 214 and 222 are as large as the image sensors 14 and 22 described in the first embodiment, respectively. The smartphone 203 includes an electric circuit unit 223 as an image generating apparatus, and a display panel 226. The display panel 226 has a touch operation function. A more detailed description will be given later but the electric circuit 223 and the display panel 226 form the image observing apparatus 232.

Even in this embodiment, similar to the second embodiment, the focal plane shutter 213 opens in the aiming for capturing a still image and in the motion image capturing, and the image sensor 214 is continuously exposed. The image signal processor 235 in the camera 201 sequentially generates a plurality of frame images as electronic images for a motion image through a variety of processes to the image signal output from the image sensor 114 for each frame. Moreover, a monitor-use image generator 236 in the camera 201 performs a predetermined process to each frame image, and generates a telephoto image (first image) that includes a plurality of frame images suitable for displays on the smartphone 203 (and the back display panel 215). In the aiming and motion image capturing, the focus state and the luminance information are detected by processing the image signal from the image sensor 214, and the lens 217c and the diaphragm unit 218 are driven in accordance with the detected result. A telephoto image generated by the image signal processor 235 is sent to the smartphone 203 from the communication unit 237 that includes a transmission function with a wireless communication using Wi-Fi®, Bluetooth®, etc.

In FIG. 8, an electric circuit unit 223 in the smartphone 203 includes a communication unit 241 that receives a telephoto image b from the communication unit 237 in the camera 201 through the wireless communication. The electric circuit unit 223 includes a signal processor 244 that provides a process so as to display the telephoto image "b" received by the communication unit 241 on the display panel 226, and a signal processor 242 that provides a process so as to display the wide-angle image "a" generated by the image signal processor 240 on the display panel 226. The communication unit 241 and the signal processor 244 correspond to the first acquirer, and the signal processor 242 corresponds to the second acquirer.

The electric circuit unit 223 includes a time division display unit 245. The time division display unit 245 alternately displays, in a time division method, a frame image of the wide-angle image "a" from the signal processor 242 and a frame image in the telephoto image "b" from the signal processor 244. By sufficiently accelerating the alternately displaying speed, a double image in which the wide-angle image "a" and the telephoto image "b" are superimposed (overlapped) on each other can be generated and observed as an observation image, and displayed on the display panel 226. The time division display unit 245 corresponds to the generator. The image generating apparatus includes the electric circuit unit 223 or the communication unit 241, the signal processor 244, the time division display unit 245 and the correcting and storing unit 243 constitute, and the image observing unit includes the display panel 226 in addition to these components.

The electric circuit unit 223 includes a microcomputer, and provides the above operation and the correction process, which will be described later, in accordance with an image generating program as a computer program.

Figure 9:
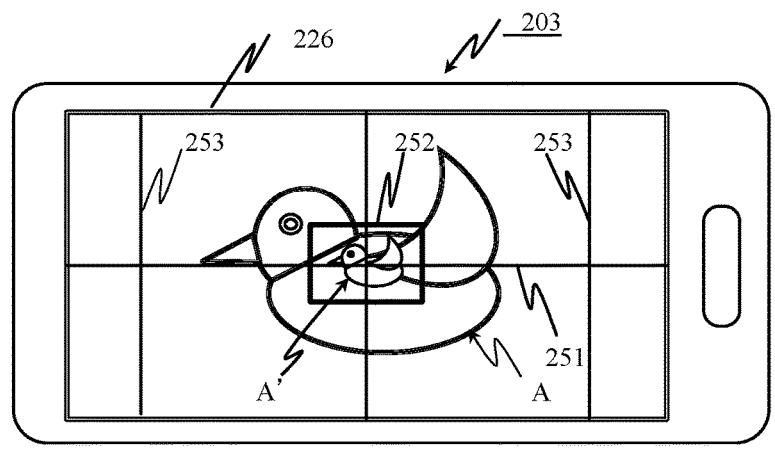
FIG. 9 illustrates a combined image displayed on a smartphone according to the third embodiment.

FIG. 9 illustrates a double image (time division alternate display image) displayed on the display panel 226 in the smartphone 203 according to this embodiment. Reference numeral 251 denotes a reticle as an index that passes the center of the display panel 226 (the center of the angle of view in the first camera (201, 202)). Reference numeral 252 denotes an auxiliary display frame as an index that indicates an angle-of-view range of the first camera (201, 202) on the wide-angle image (second image) obtained by the smartphone 203. Reference numeral 253 indicates a display range of the first image. Similar to FIG. 3A, "A" denotes a main object (bird) in the telephoto image obtained by the first camera (201, 202), and "A'" denotes a bird in the wide-angle image obtained by the smartphone 203. As illustrated in FIG. 9, when the angle of view in the smartphone 203 and the size of the display panel 226 are laterally longer than the angle of view in the first camera (201, 202), the wide-angle image in the longitudinal direction can be more widely confirmed and an improvement of the operability can be expected.

In FIG. 8, the electric circuit unit 223 in the smartphone 203 includes a correcting and storing unit 243 as a corrector. Even in this embodiment, when the smartphone 203 is attached to the connector 225, the center and the inclination of the angle of view of the smartphone 203 may not coincide with those of the first camera (201, 202). Thus, the correcting and storing unit 243 provides a correction process to the wide-angle image so as to coincide the centers of the angle of view or the inclinations of the angle of view through a finger and a touch operation function of the display panel 226 in the smartphone 203. More specifically, the correcting and storing unit 243 provides a correction process that cuts the wide-angle image obtained when the center of the angle of view in the smartphone 203 accords with that in the first camera (201, 202) based on the pre-cut wide-angle image generated by the smartphone 203. In addition, the correcting and storing unit 243 performs a correction process so as to rotate the wide-angle image generated in the smartphone 203 so as to reduce or zero the slope of the angle of view in the smartphone 203 relative to the angle of view of the first camera (201, 202). Thereby, the double image can be generated which corresponds to the double image obtained when the first camera (201, 202) and the smartphone 203 have the coincided centers and equal slopes of the angles of view.

Even in this embodiment, similar to the second embodiment, the correcting and storing unit 243 as a storage unit stores correction information, such as a cut position and rotation angle of the wide-angle image, when the correction process is performed.

As described above, the first to third embodiment can display a large telephoto image, which is easy to see. Without reducing or compressing the wide-angle image, the double image including the telephoto image and the wide-angle image can be observed and presented to the user. Thus, the user who follows the main object that is lost in the telephoto image can intuitively operate the first camera. Moreover, since the wide-angle image is superimposed on the area that contains the center of the telephoto image and is made observable, the user does not have to move the visual axis from when the user views the telephoto image to when the user views the wide-angle image. Thus, the user can correctly and quickly provide framing.

While the first to third embodiments generate a double image as a whole double area in which the first and second images having the equal sizes are superimposed on each other, the double area may be part of the first image. Even in this case, the double area may be the area that contains the center of the first image, and the excessively narrow double area (or the wide-angle area) may be avoided.

Fourth Embodiment

The first to third embodiments provide to the user an observation image as a double image in which the first and second images having different angles of view are superimposed on each other. However, in the double image in which the first and second images are superimposed, the user may have difficulties in distinguishing the objects while he observes them, when the colors and shapes of the objects contained in the first and second images are superimposed on each other.

Figure 10A:
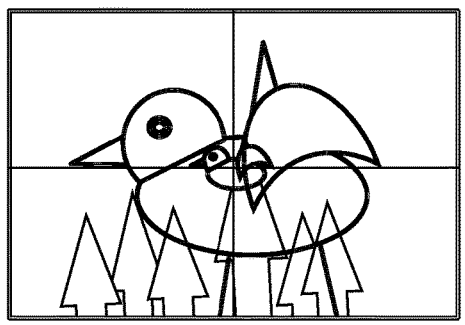
FIGS. 10A to 10C illustrate illustrative double images according to a fourth embodiment of the present invention.
Figure 10B:
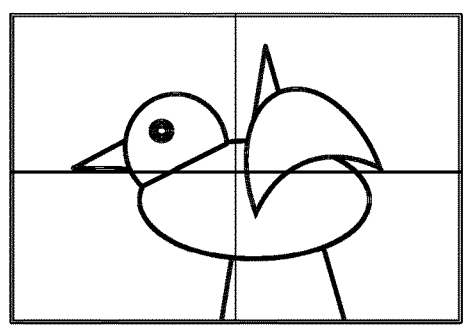
Figure 10C:
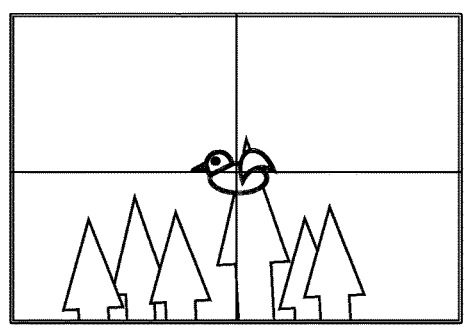

FIG. 10B illustrates a first image (telephoto image) in which a bird perching on the tree is set to the main object obtained by the first camera. FIG. 10C illustrates a second image (wide-angle image) in which the bird and the woods containing the tree on which the bird perches, obtained by the second camera having an angle of view wider than that of the first camera. FIG. 10A illustrates a double image in which the first image illustrated in FIG. 10B is superimposed on the second image illustrated in FIG. 10C, which is observable through the eyepiece lens 9 in the first embodiment or displayed on the liquid crystal monitor 108 or the display panel 226 in the second and third embodiments. In this double image, the appearances (outlines) partially overlap as well as colors between the bird in the first image and the bird in the second image, and it is difficult to distinguish them from each other. It is difficult to quickly recognize whether the woods in the second embodiment belong to the first image or the second image.

Thus, this embodiment provides image processing so as to facilitate the distinction between the first image and the second image.

FIG. 11A illustrates a double image in which the contrast of the first image illustrated in FIG. 10B is changed (weakened) through image processing and the processed first image is superimposed on the second image illustrated in FIG. 10C. FIG. 11B illustrates a double image in which the contrast of the second image illustrated in FIG. 10C is weakened through image processing and the processed second image is superimposed on the first image illustrated in FIG. 10B. In any one of these double images, as hatched, the contrast of one of the first image and the second image is made different from that of the other so as to facilitate the distinction between both images.

FIG. 12A illustrates a double image in which an outline of the first image illustrated in FIG. 10A is highlighted through image processing and the processed first image is superimposed on the second image illustrated in FIG. 10C. FIG. 12B illustrates a double image in which an outline of the second image illustrated in FIG. 10C is highlighted through image processing and the processed second image is superimposed on the first image illustrated in FIG. 10B. Both images can become more easily distinguished by highlighting the outline of one of the first image and the second image.

A method for facilitating the distinction between the first and second images in the double image is not limited to a change of the contrast and a highlight of the outline, and the present invention may use image processing that changes a chroma of one of the images and provides a monochromatic or single color image, and image processing that changes a color tone or a resolution in one of the images. As described in the second embodiment, when one of the images is set to a semi-transmissive image or an outline image, the first image and the second image can be more easily distinguished from each other. The transmittance of the semi-transmissive image and the thickness of the outline of the outline image may be adjusted. In addition, a combination of a plurality of types of image processes may be applied to one of the images. For example, the contrast and the transmittance of part other than outline highlighted part may be changed, a single color may be used for display, or a color tone or resolution may be changed.

Operating the camera and smartphone, a user can arbitrarily select the image to be processed, select a type of image processing, and adjust the transmittance and the thickness of the outline.

Each of the above embodiments enables the first image to be easily observed, and the double image that includes the first image and the second image having an angle of view wider than that of the first image to be observed. Thereby, each embodiment enables the object outside the first image to be easily found in the second image and can improve the quick imaging on the telephoto side and the operability of the imaging apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-081885, filed Apr. 15, 2016, which is hereby incorporated by reference herein in its entirety.

What is claimed is:

1. An image generating apparatus comprising:
a first generator configured to obtain a first image using a first camera with a first angle of view;
a second generator configured to obtain a second image using a second camera with a second angle of view wider than the first angle of view; and
a generator configured to generate an observation image, using the first image and the second image, that is observable as a double image where the first image and the second image are overlapped on each other in an area that contains a center of the first image.

2. The image generating apparatus according to claim 1, wherein the second image is an image when a center of the second angle of view coincides with the center of the first angle of view.

3. The image generating apparatus according to claim 1, wherein the second image corresponds to an image obtained when there is no inclination of the second angle of view relative to the first angle of view.

4. The image generating apparatus according to claim 1, wherein:
the first image is an optical image obtained through an optical system in the first camera, and the second image is an electronic image generated through imaging by the second camera and displayed on a display device, and
the generator generates the observation image by optically overlapping the optical image and the electronic image on each other.

5. The image generating apparatus according to claim 1, wherein:

the first image is an electronic image obtained through imaging in the first camera, and the second image is an electronic image obtained through imaging in the second camera, and the generator generates the observation image through image processing that overlaps the first image and the second image on each other.

6. The image generating apparatus according to claim 1, wherein the second image is an electronic image obtained through imaging in the second camera, and is a semi-transmissive image or an image made by extracting an outline of an object.

7. The image generating apparatus according to claim 1, wherein the generator generates the observation image by enabling the first image and the second image to be alternately observed.

8. The image generating apparatus according to claim 2, wherein:

the generator performs a correction process that cuts the second image obtained while the center of the second angle of field coincides with the center of the first angle of field, based on an electronic image used to cut the second image and obtained from the second camera, and the image generating apparatus further comprises a storage unit configured to store correction information on a cut position of the second image when the correction process is performed.

9. The image generating apparatus according to claim 3, wherein:

the generator performs a correction process that rotates the second image to reduce the inclination of the second angle of view relative to the first angle of view, and the image generating apparatus further comprises a storage unit configured to store correction information on a rotation angle of the second image when the correction process is performed.

10. The image generating apparatus according to claim 1, wherein the observation image includes an index that indicates a range corresponding to the first angle of view on the second image.

11. The image generating apparatus according to claim 1, wherein the observation image includes an index that indicates a center of the first angle of view.

12. The image generating apparatus according to claim 1, wherein one image, among the first image and the second image in the observation image is an image that has subjected to image processing performed by the generator for distinguishing the one image from the other of the first image or the second image.

13. The image generating apparatus according to claim 12, wherein the image processing changes a contrast, a chroma, a color tone, a resolution, or a transmittance, or highlights an outline.

14. The image generating apparatus according to claim 1, wherein the observation image is observable as the double image where the entirely of the first and second images are overlapped on each other in the area that contains the center of the first image.

15. The image generating apparatus according to claim 1, wherein the observation image is observable as the double image where the first image and the second image are overlapped on each other in the area that contains the center of the first image, with a size of the first image equal to or greater than that of the second image.

16. An image observing apparatus comprising:

an image generating apparatus that includes:

a first generator configured to obtain a first image using a first camera with a first angle of view;

a second generator configured to obtain a second image using a second camera with a second angle of view wider than the first angle of view, and a generator configured to generate an observation image, using the first image and the second image, that is observable as a double image where the first image and the second image are overlapped on each other in an area that contains a center of the first image; and a display device configured to allow a user to observe the observation image.

17. An imaging apparatus comprising:

a first camera with a first angle of view;

a second camera with a second angle of view wider than the first angle of view, fixed onto or detachably attached to the first camera;

an image generating apparatus that includes:

a first generator configured to obtain a first image using the first camera;

a second generator configured to obtain a second image using the second camera; and a generator configured to generate an observation image, using the first image and the second image, that is observable as a double image where the first image and the second image are overlapped on each other in an area that contains a center of the first image; and a display device configured to allow a user to observe the observation image.

18. The imaging apparatus according to claim 17, wherein the first camera includes an image sensor larger than that of the second camera.

19. The imaging apparatus according to claim 17, further comprising an adjuster configured to adjust an inclination of the second camera to coincide a center of the second angle of view with a center of the first angle of view.

20. The imaging apparatus according to claim 17, further comprising an adjuster configured to adjust an inclination of the second camera to reduce an inclination of the second angle of view relative to the first angle of view.

21. A non-transitory computer-readable storage medium for storing an image generating program as a computer program that enables a computer to execute a method, the method comprising the steps of:

obtaining a first image using a first camera with a first angle of view;

obtaining a second image using a second camera with a second angle of view wider than the first angle of view; and generating an observation image, using the first image and the second image, that is observable as a double image where the first image and the second image are overlapped on each other in an area that contains a center of the first image.

* * * * *